US010244684B2

(12) United States Patent
Devroe et al.

(10) Patent No.: US 10,244,684 B2
(45) Date of Patent: Apr. 2, 2019

(54) RECTANGULAR BALER WITH IMPROVED STUFFER MECHANISM

(71) Applicant: CNH Industrial America LLC, New Holland, PA (US)

(72) Inventors: Jeroen Devroe, Izegem (BE); Dieter Kindt, Vladslo (BE); Dries Liefooghe, Veurne (BE); Bram Rosseel, Snellegem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/484,932

(22) Filed: Apr. 11, 2017

(65) Prior Publication Data

US 2017/0290273 A1    Oct. 12, 2017

(30) Foreign Application Priority Data

Apr. 11, 2016 (BE) .................................. 2016/5250

(51) Int. Cl.
 *A01F 15/10* (2006.01)
 *A01F 15/04* (2006.01)
(52) U.S. Cl.
 CPC ............ *A01F 15/10* (2013.01); *A01F 15/042* (2013.01); *A01F 15/101* (2013.01)
(58) Field of Classification Search
 CPC .. A01F 15/101; A01F 2015/102; A01F 15/10; A01F 15/042; A01F 15/046; A01F 15/08; A01D 89/00; A01D 85/002; A01D 90/02; B30B 15/041
 See application file for complete search history.

(56) References Cited

U.S. PATENT DOCUMENTS

| 4,034,543 A | * | 7/1977 | Voth | A01D 89/00 100/142 |
| 4,106,267 A | * | 8/1978 | White | A01D 89/00 100/2 |
| 4,106,268 A | * | 8/1978 | White | A01D 85/002 100/2 |

(Continued)

FOREIGN PATENT DOCUMENTS

| DE | 9001858 U1 | 6/1990 |
| EP | 0870425 A1 | 10/1998 |

(Continued)

*Primary Examiner* — Arpad Fabian-Kovacs
(74) *Attorney, Agent, or Firm* — Peter K. Zacharias (57) ABSTRACT

A rectangular baler including a baling chamber, an intake duct, a pick-up mechanism for picking up crop material and introducing it into the intake duct, and a stuffer mechanism to selectively execute a packer stroke to advance crop material partially along the intake duct and a stuffer stroke to transfer the crop material accumulated in the intake duct into the baling chamber. The stuffer mechanism includes a tine bar extending between two stuffer assemblies at each side of the baler. Each stuffer assembly includes a first stuffer arm connected at a first pivot point to a first crank arm of a first drive mechanism, a second stuffer arm connected at a second pivot point to a second crank arm of a second drive mechanism, and a coupling plate pivotally mounted around a stationary pivot point. The coupling plate couples the first stuffer arm with the second stuffer arm.

14 Claims, 9 Drawing Sheets

(56) References Cited

U.S. PATENT DOCUMENTS

| | | | | |
|---|---|---|---|---|
| 4,656,938 A * | 4/1987 | Webb | A01F 15/101 | 100/189 |
| 4,862,797 A * | 9/1989 | Mathis | A01F 15/02 | 100/142 |
| 5,467,702 A * | 11/1995 | Naaktgeboren | A01D 90/02 | 100/142 |
| 6,026,741 A * | 2/2000 | Lippens | A01F 15/0825 | 100/191 |
| 6,474,228 B1 * | 11/2002 | Leupe | A01F 15/04 | 100/100 |
| 6,546,705 B2 * | 4/2003 | Scarlett | A01F 15/00 | 56/10.2 R |
| 8,826,816 B2 * | 9/2014 | Vergote | A01F 15/101 | 100/188 R |
| 9,167,750 B2 * | 10/2015 | Herron | A01F 15/0825 | |
| 9,386,750 B2 * | 7/2016 | Verhaeghe | A01F 15/0825 | |
| 9,426,944 B2 * | 8/2016 | Naeyaert | A01F 15/10 | |
| 9,597,850 B2 * | 3/2017 | Dedeurwaerder | A01F 15/042 | |
| 9,609,808 B2 * | 4/2017 | Dumarey | A01F 15/101 | |
| 2002/0108509 A1 * | 8/2002 | Leupe | A01F 15/0825 | 100/45 |
| 2012/0000377 A1 * | 1/2012 | Verhaeghe O.M. | A01F 15/0825 | 100/45 |
| 2012/0179338 A1 * | 7/2012 | Dresher | A01F 15/101 | 701/50 |
| 2012/0204740 A1 * | 8/2012 | Bergmann | A01F 15/101 | 100/99 |
| 2012/0240797 A1 * | 9/2012 | Verhaeghe | A01F 15/0825 | 100/43 |
| 2013/0104512 A1 * | 5/2013 | Duenwald | A01F 15/101 | 56/341 |
| 2014/0076178 A1 * | 3/2014 | Naaktgeboren | A01F 15/101 | 100/142 |
| 2014/0165859 A1 * | 6/2014 | O'Reilly | A01F 15/0841 | 100/179 |
| 2016/0270297 A1 * | 9/2016 | Coen | A01D 89/006 | |
| 2017/0188519 A1 * | 7/2017 | Figger | A01F 15/042 | |

FOREIGN PATENT DOCUMENTS

| | | | | |
|---|---|---|---|---|
| WO | 2012/163903 A1 | 12/2012 | | |
| WO | WO-2017116982 A1 * | 7/2017 | | A01F 15/08 |

* cited by examiner

RECTANGULAR BALER WITH IMPROVED STUFFER MECHANISM

CROSS REFERENCE TO RELATED APPLICATION

This application claims priority to Belgium Application No. 2016/5250 filed Apr. 11, 2016, the contents of which are incorporated herein by reference.

FIELD OF THE INVENTION

The field of the invention relates to a rectangular baler, and in particular to a rectangular baler comprising a baling chamber, an intake duct for accumulating crop material before transfer into the baling chamber, and a stuffer mechanism configured to selectively execute a packer stroke to advance crop material partially along the intake duct and a stuffer stroke to transfer the crop material accumulated in the intake duct into the baling chamber.

BACKGROUND OF THE INVENTION

Prior art rectangular balers are used to gather crop material that has been deposited on the ground in swaths or windrows and to pack the crop into tied bales. Such balers are typically towed by a tractor and driven by the power take off (PTO) shaft of the tractor.

Rectangular balers have a baling chamber with a reciprocating plunger at one end and a bale outlet at the other end. An intake duct communicates with the baling chamber near the end which is closed by the passing plunger. Crop material is loaded into the intake duct by a pickup to form a slice of crop material. Once the slice has reached a desired density, a so-called stuffer transfers the slice into the baling chamber where it is compressed by the plunger against the crop material already present in the baling chamber. After a bale of the desired size has been formed by compressing several such slices, twine is wrapped around the bale and tied. The tied bale moves through the bale chamber to the outlet whilst offering resistance to allow the next bale to be compressed.

The present invention is concerned with the preparation of slices within the intake duct and with the transfer of the slices by the stuffer from the intake duct into the baling chamber.

The intake duct communicates at its upper end with the baling chamber and at its lower end with a packer or rotor. The packer or rotor has rotating blades or tines that propel the crop material picked up from the ground towards the upper end of the duct. Once the crop material attains a desired density within the intake duct, which may be determined e.g. by a sensor, a cycle of the stuffer is commenced to transfer that slice into the baling chamber.

In certain prior art balers the stuffer operates in the same manner as a rake and has two mechanically driven arms carrying a tine bar at their free end. The upper wall of the intake duct has elongated slots that allow the tines of the stuffer to enter into the duct to engage the crop material packed within it. The movement of the arms causes the tines to follow a generally kidney shaped path so that they sweep along the entire intake duct to push the slice into the baling chamber. On reaching the upper end of the intake duct, they are retracted from the intake duct and return outside the intake duct to a position near the lower end of the duct in readiness for the next stuffer cycle. A problem that can be encountered is that the packer cannot propel the crop material sufficiently into the intake duct to achieve an even distribution within the intake duct. As a result, the crop material is denser near the packer than at its upper end near the baling chamber. Aside from creating bales of uneven density, there is a risk that clogging may occur near the lower end of the intake duct.

To address this problem U.S. Pat. No. 6,050,074 teaches using the stuffer to assist in redistributing the crop material within the intake duct. This is achieved by operating the stuffer in one of two modes. In a first mode, the stuffer performs a short packer stroke so that it only displaces the crop material partially along the intake duct. In the second mode, the stuffer performs a full stuffer stroke to transfer the contents of the intake duct into the baling chamber. The mechanism of U.S. Pat. No. 6,050,074 has the disadvantage of using a complex system of levers.

EP 2 713 704 also operates in two modes but uses a simpler and more compact stuffer drive mechanism. The stuffer of EP 2 713 704 comprises a stuffer arm connected at a first pivot point to a crank arm that is driven to rotate at a multiple of the cycling rate of the plunger, and the stuffer arm is acted upon at a second pivot point by a cam track and follower arrangement selectively driveable in synchronism with the crank arm by way of a disengageable clutch. In one mode, the second pivot point of the stuffer arm is held stationary, wherein the tines disposed on its free end follow a first kidney shaped path. The maximum depth of the path is determined by the length of the crank arm but the length of its sweep through the intake duct will depend on the position of the second pivot point relative to the axis of rotation of the crank arm and relative to the intake duct.

SUMMARY OF THE INVENTION

The object of embodiments of the invention is to improve the stuffer drive mechanisms of the prior art.

According to a first aspect, there is provided a rectangular baler comprising a baling chamber, a plunger reciprocally mounted in the baling chamber for compressing crop material, an intake duct for accumulating crop material before transferring into the baling chamber, a pick-up mechanism for picking up crop material and introducing the crop material into the intake duct, and a stuffer mechanism configured to selectively execute a packer stroke to advance crop material partially along the intake duct and a stuffer stroke to transfer the crop material accumulated in the intake duct into the baling chamber. The stuffer mechanism comprises a tine bar extending between two stuffer assemblies at each side of the baler. At least one stuffer assembly thereof comprises a first stuffer arm, a second stuffer arm, and a coupling plate coupling said first stuffer arm with said second stuffer arm. The tine bar is connected to the first stuffer arm. The first stuffer arm is connected at a first pivot point to a first crank arm of a first drive mechanism. The second stuffer arm is connected at a second pivot point to a second crank arm or disc of a second drive mechanism. The coupling plate is pivotally mounted around a stationary pivot point and is coupled to the first or second stuffer arm through a connection configured to allow a predetermined limited movement of the first or second stuffer arm with respect to the coupling plate.

Embodiments of the invention are based inter alia on the inventive insight that by using a pivotally mounted coupling plate and a connection configured to allow a predetermined limited movement of the first or second stuffer arm with respect to the coupling plate, for the coupling of the coupling plate with the first or second stuffer arm, the forces exerted on the first stuffer arm can be largely taken up by the first drive mechanism, and the load on the connection can be reduced. Also, such an implementation will allow to have the connection further away from the intake duct, resulting in less dust in the connection, and hence an improved operation of the stuffer mechanism.

In a preferred embodiment the connection is a slot-pin connection. Such a slot-pin connection, which is typically sensitive to the presence of dust and to wear due to high loads, may be further away from the intake duct, resulting in less dust in the slot-pin connection and a reduced load on the slot-pin connection, and hence an improved operation of the stuffer mechanism.

In an exemplary embodiment, the coupling plate has a slot as part of the slot-pin connection, and the first stuffer arm is provided with a pin which is moveable in the slot. In that way, the first stuffer arm can have an elongate shape with a bottom end near the tine bar and a top end that is provided with the pin of the slot-pin connection. The forces will then be largely taken up at the bottom end and transferred to the first drive mechanism via the first crank arm.

In an exemplary embodiment, the second stuffer arm is connected pivotally with the coupling plate.

In an exemplary embodiment, the first drive mechanism is configured to rotate at a first rotational speed which is a multiple of a second rotational speed of the second drive mechanism. In that manner, one or more packer strokes may be performed between two stuffer strokes.

In an exemplary embodiment, the stationary pivot point of the coupling plate has a pivot axis which corresponds with a rotation axis of the first drive mechanism around which the first crank arm rotates. This will result in a compact and robust construction.

In an exemplary embodiment, the stationary pivot point around which the coupling plate is pivotally mounted is in a lower half of the coupling plate, preferably in a lower third of the coupling plate, wherein the lower half of the coupling plate is the area of the coupling plate below half the height of the coupling plate when the coupling plate is in the highest position.

In an exemplary embodiment, the slot is provided in an upper two thirds of the coupling plate, wherein the upper two thirds of the coupling plate is the area of the coupling plate above one third of the height of the coupling plate when the coupling plate is in the highest position. In that way, the slot is further away from the intake duct, and the forces exerted on the slot will be lower. Also, the dust accumulation will be less.

In an exemplary embodiment, the coupling plate is pivotally connected to the second stuffer arm at a pivot point which is located between the slot and the stationary pivot point. This will result in a compact construction.

In an exemplary embodiment, the slot of the slot-pin connection is substantially straight. In that manner, wear of the slot-pin connection can be limited.

In an exemplary embodiment, the slot of the slot-pin connection is oriented at an angle with respect to a vertical direction, said angle being smaller than 30 degrees in the highest position of the coupling plate. By having a relatively small angle, if there were to be any dust in the slot, this dust will fall out of the slot during operation.

In an exemplary embodiment, the first pivot point of the first stuffer arm is nearer to the intake duct than the second pivot point of the second stuffer arm.

In an exemplary embodiment, instead of using a slot-pin connection, the connection may comprise a crank arm or disc. When a crank arm is used, a first end of the crank arm may be connected pivotally to the first or second stuffer arm and a second end of the crank arm may be connected pivotally to the coupling plate. When a disc is used, a point near the circumference of the disc may be connected pivotally to the first or second stuffer arm and an axis of the disc may be connected pivotally to the coupling plate. In such an embodiment the path followed by the pivot point between the first stuffer arm and the crank arm is typically less straight compared to the previous embodiments with a slot-pin connection, and typically more space will be required, but as the crank arm performs a rotating movement it is less hindered by the presence of dust.

BRIEF DESCRIPTION OF THE DRAWINGS

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF THE DRAWINGS

The drawings are only schematic and are non-limiting. In the drawings, the size of some of the elements may be exaggerated and not drawn on scale for illustrative purposes.

Any reference signs in the claims shall not be construed as limiting the scope. In the drawings, the same reference signs refer to the same or analogous elements.

The terms "front", "rear", "forward", "rearward", "left" and "right" used throughout this description are determined with respect to the normal direction of travel of the machine in operation. However, they are not to be construed as limiting terms.

Embodiments of the present invention can be used in agricultural balers for the production of rectangular bales of agricultural material such as hay, straw, silage or similar crop material that previously has been cut, windrowed or swathed, and is picked up from an agricultural field. The produced rectangular bales may have high density, hence a high mass, for example of 500 kg or more.

Figure 1:
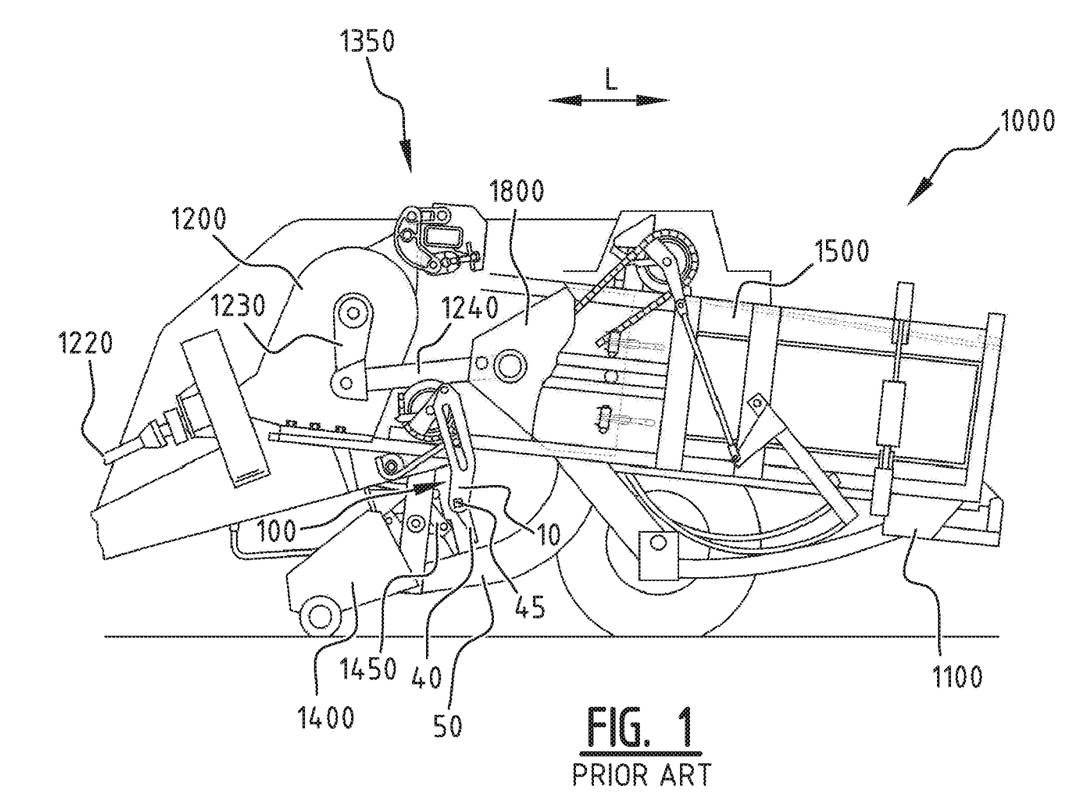
FIG. 1 is a schematic drawing of an exemplary embodiment of a rectangular baler.

Part of an agricultural baler 1000 is illustrated in FIG. 1. Baler 1000 has a longitudinal direction L extending in the traveling direction of the baler, and a transverse direction. Baler 1000 comprises a main frame 1100 onto which all parts are mounted. The baler 1000 comprises a baling chamber 1500. The baler 1000 is provided with a gearbox 1200. The top portion of the gearbox 1200 is held in place by a linkage and sensor assembly 1350. The gearbox 1200 provides actuation of the different parts of the baler 1000 that need to be actuated. The gearbox 1200 may be actuated by a tractor pulling the baler 1000 by means of a transmission shaft 1220 between the tractor and the baler 1000. The gearbox 1200 provides a direct actuation of a plunger 1800. Hereto, the plunger 1800 may for example be connected to the gearbox 1200 by means of crank arms 1230 and connection rods 1240, also called pitman rods. The plunger 1800 presses the collected crop material obtained from a feeder duct 50, also called intake duct, against the bale that is being formed in the baling chamber 1500.

A slice of crop material that is being inserted from feeder duct 50 at the front end of baling chamber 1500 is being compressed against the crop material that is already in bale chamber 1500 during an active stroke of plunger 1800. Plunger 1800 performs a cyclic plunger movement, i.e. plunger 1800 reciprocates forward and back to compress consecutive slices of crop material against crop material that is already in bale chamber 1500.

The present invention is concerned with the preparation of slices within the intake duct 50, typically an upwardly concave intake duct, and with the transfer of the slices by a stuffer mechanism 100 from the intake duct 50 into the baling chamber 1500.

The intake duct 50 communicates at its upper end with the baling chamber 1500 and at its lower end with a packer or rotor 1450. The packer or rotor mechanism 1450 has rotating blades or tines that propel the crop material picked up from the ground by a pick-up mechanism 1400, towards the upper end of the intake duct 50. Once the crop material attains a desired density within the intake duct 50, which may be determined e.g. by a sensor, a cycle of the stuffer mechanism 100 is commenced to transfer that slice into the baling chamber 1500.

When a complete slice of crop material has been accumulated within the intake duct 50, the stuffer arm 20 is operated in a stuffer mode, to move tines 40 along a kidney shaped path (not shown in FIG. 1). In this mode, the stuffer acts to transfer the slice formed within the intake duct into the baling chamber.

The stuffer mechanism 100 has two mechanically driven stuffer arms 10 symmetrically arranged one on each side of the baler and carrying a tine bar 45 with tines 40. The upper wall of the intake duct 50 has elongated slots that allow the tines 40 of the stuffer to enter into the duct to engage the crop material packed within it. The movement of the arms 10 causes the tines 40 to follow a generally kidney shaped path (not shown in FIG. 1) so that they sweep along the entire intake duct 50 to push the slice into the baling chamber 1500. On reaching the upper end of the intake duct 50, they are retracted from the intake duct and return outside intake duct to a position near the lower end of the intake duct in readiness for the next stuffer cycle. A problem that can be encountered in prior art balers is that the packer mechanism 1450 cannot propel the crop material sufficiently into to the intake duct 50 to achieve an even distribution within the intake duct. As a result, the crop material is denser near the packer mechanism 1450 than at the upper end near the baling chamber. Aside from creating bales of uneven density, there is a risk that clogging may occur near the lower end of the intake duct 50.

FIGS. 2A-2D, and 3A-B illustrate a first exemplary embodiment of a stuffer mechanism according to the invention. The stuffer mechanism 100 is configured to selectively execute a packer stroke (path P of the tines 40, see further) to advance crop material partially along an intake duct 50 and a stuffer stroke (path S of the tines 40, see further) to transfer the crop material accumulated in the intake duct 50 into the baling chamber 1500. The stuffer mechanism 100 comprises two stuffer assemblies, one at each side of the baler, and a tine bar extending between the two stuffer assemblies. The two stuffer assemblies may be similar and may be arranged symmetrically at each side of the baler, but may also be different, wherein e.g. only one of the stuffer assemblies is actuated. In other words the stuffer mechanism 100 may be symmetrical with driving mechanisms on each side, or may be asymmetrical, e.g. with a driving mechanism on only one side.

At least one of the stuffer assemblies comprises a first stuffer arm 10, a second stuffer arm 20, and a coupling plate 30 coupling the first stuffer arm 10 with the second stuffer arm 20. Only one stuffer assembly 10, 20, 30 is visible in the side view of FIG. 2A, but the skilled person understands that, in a symmetrical variant with two similar stuffer assemblies, two first stuffer arms 10 are arranged symmetrically, one at each side of the baler, and the tine bar extends between the two first stuffer arms 10. The first stuffer arm 10 is connected at a first pivot point 11 to a first crank arm 110 of a first drive mechanism. The second stuffer arm 20 is connected at a second pivot point 21 to a second crank arm 120 of a second drive mechanism. The first stuffer arm 10 is connected to the second stuffer arm 20 via a pivotally mounted coupling plate 30. The coupling plate 30 is pivotally mounted around a stationary pivot point 31. The coupling plate 30 is coupled to the first stuffer arm 10 through a slot-pin connection 12, 32. The first pivot point 11 of the first stuffer arm 10 is nearer to the intake duct 50 than the second pivot point 21 of the second stuffer arm 20.

Figure 2A:
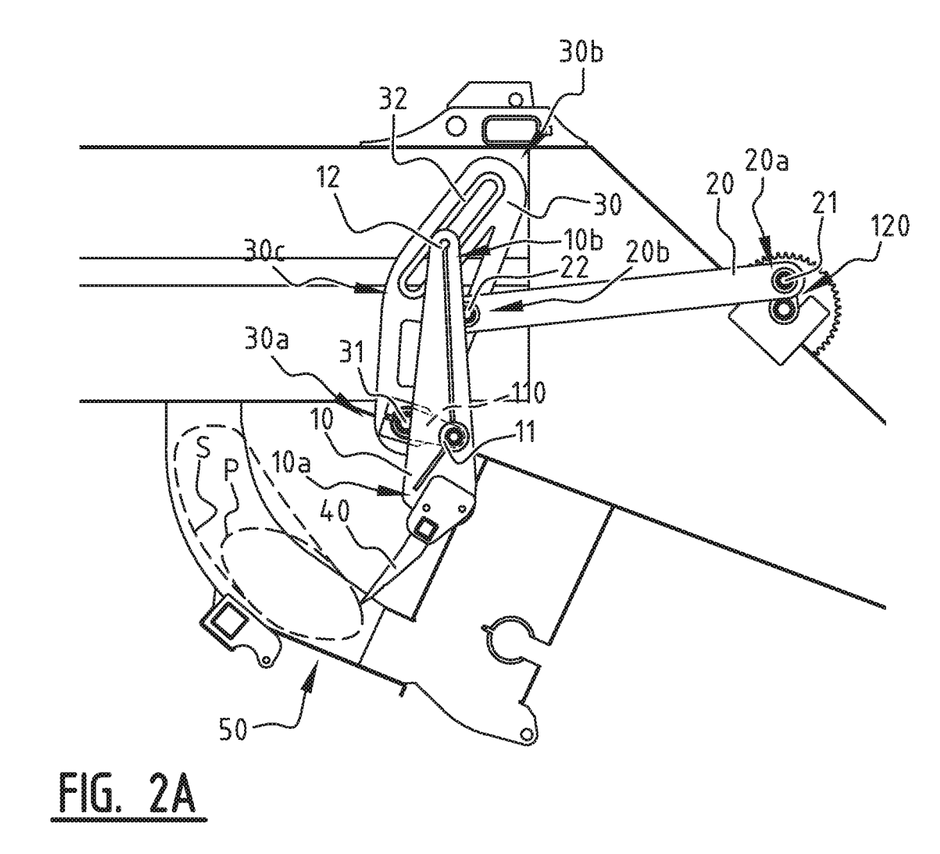
FIGS. 2A, 2B, 2C and 2D show a side view of a first exemplary embodiment of a stuffer mechanism at four different stages while performing a stuffer stroke.
Figure 2B:
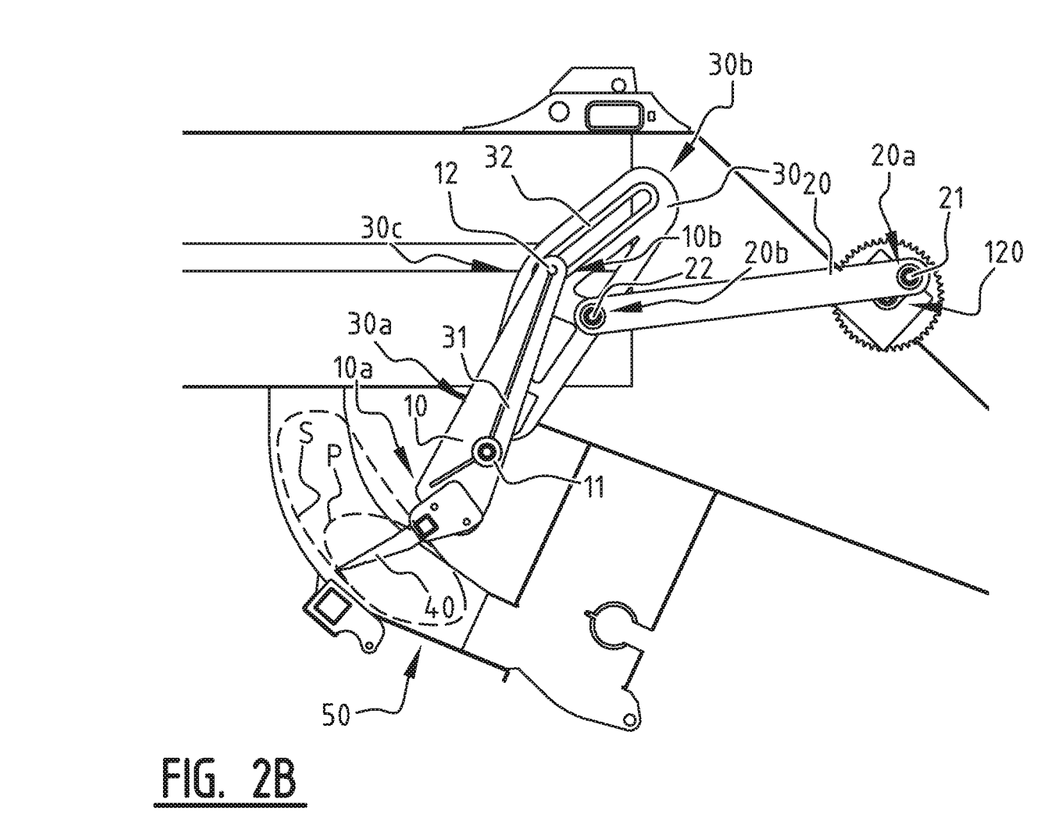
Figure 2C:
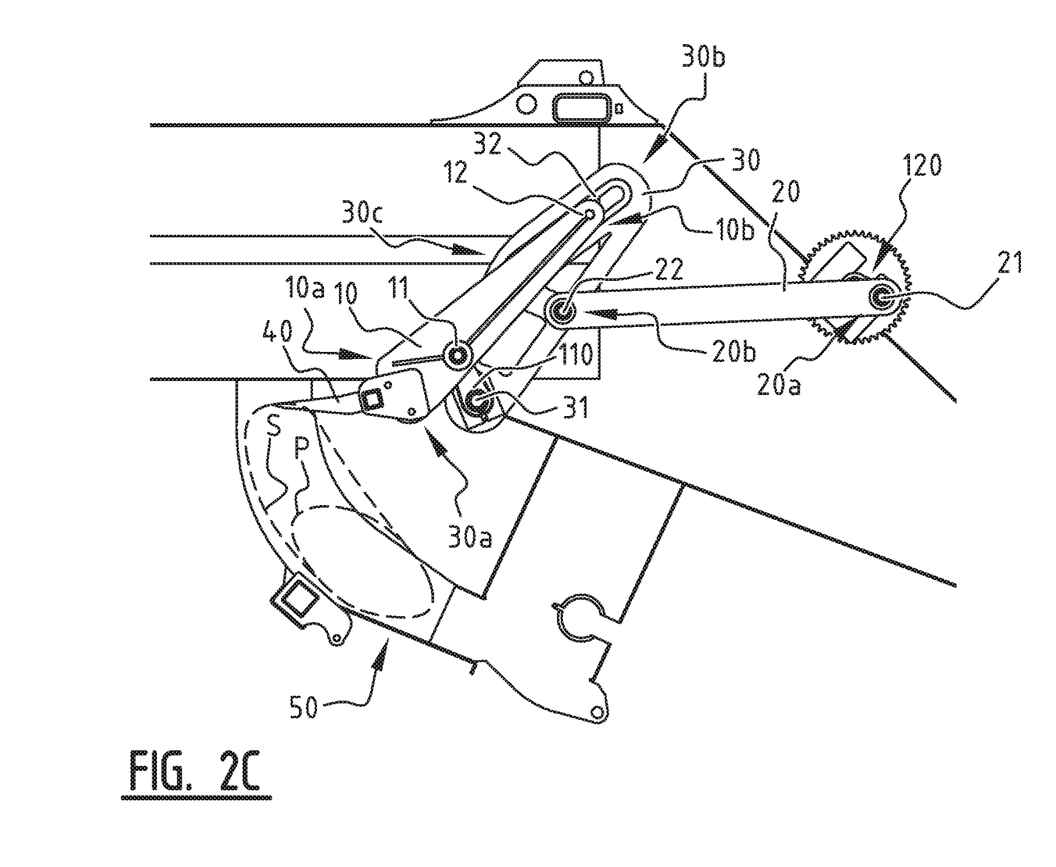
Figure 2D:
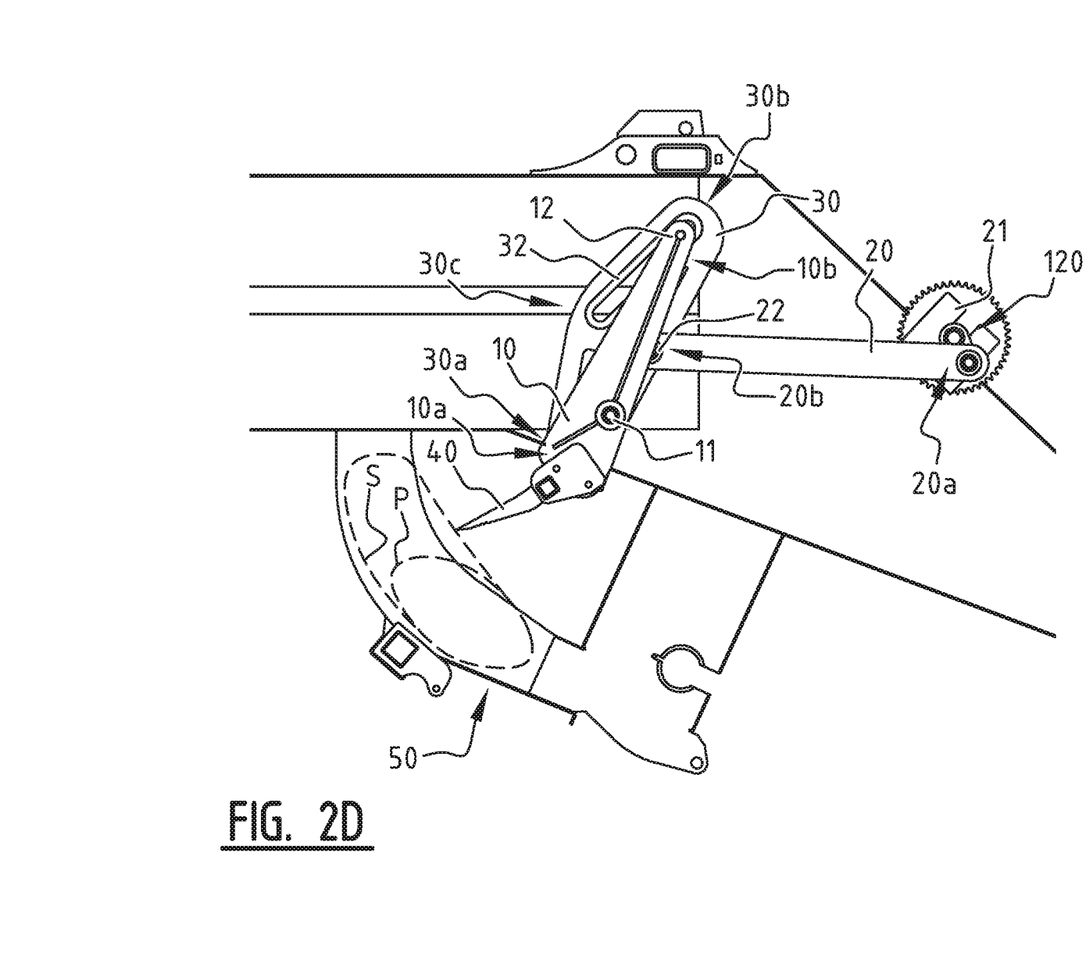

The first drive mechanism is preferably configured to rotate at a first rotational speed which is a multiple of a second rotational speed of the second drive mechanism. It is preferred that the second crank arm 120 is rotated at the frequency of the plunger 1800 and that the first crank arm 110 is rotated at twice the frequency of the plunger 1800 so that the stuffer arm 10 may perform a packer stroke (path P) followed by a stuffer stroke (path S) during each reciprocation of the plunger 1800. It is further preferred for the first and second crank arm 110, 120 to be driven for engagement to take place in synchronism with the movement of the plunger 1800, such that the tines reach the end of the intake duct 50 as the plunger 1800 is about to commence a compression stroke.

The coupling plate 30 has a substantially triangular shape with a bottom corner 30a, a top corner 30b, and an intermediate corner 30c. However, other shapes are possible as will become apparent when discussing the second and third exemplary embodiments below. The coupling plate 30 is provided with a slot 32 as part of the slot-pin connection 12, 32. The first stuffer arm 10 is an elongate arm having a first end 10a connected to the tine bar, and a second end 10b which is provided with a pin 12 which is moveable in the slot 32. In other words, the pin-slot connection 12, 32 is a cam-follower arrangement. The first stuffer arm 10 is connected at the first pivot point 11 to the first crank arm 110, and the first pivot point 11 is located nearer to the first end 10a than to the second end 10b, and preferably in the lower third part of the first stuffer arm 10, seen in a length direction of the elongate first stuffer arm 10. The second stuffer arm 20 has a first end 20a connected to the second crank arm 120 and a second end 20b. The second end 20b is connected pivotally at a pivot point 22 with the coupling plate 30.

The stationary pivot point 31 has a pivot axis which corresponds with a rotation axis of the first drive mechanism around which the first crank arm 110 rotates. The stationary pivot point 31 around which the coupling plate 30 is pivotally mounted is preferably in a lower half of the coupling plate 30, more preferably in a lower third of the coupling plate 30. The lower third of the coupling plate is the area of the coupling plate below a third of the height (h/3) of the coupling plate 30 when the coupling plate is in the highest position, see FIG. 3B. Preferably, slot 32 is provided in an upper two thirds of the coupling plate, wherein the upper two thirds of the coupling plate is the area of the coupling plate above one third of the height of the coupling plate when the coupling plate is in the highest position, see FIG. 3B. The coupling plate 30 is pivotally connected to the second stuffer arm 20 at a pivot point 22 which is located between the slot 32 and the stationary pivot point 31.

Preferably, slot 32 of the slot-pin connection 12, 32 is substantially straight in order to limit the load on the slot plate, and in particular on the edges delimiting the slot 32. However, it is also possible to have a curved slot 32.

Figure 3A:
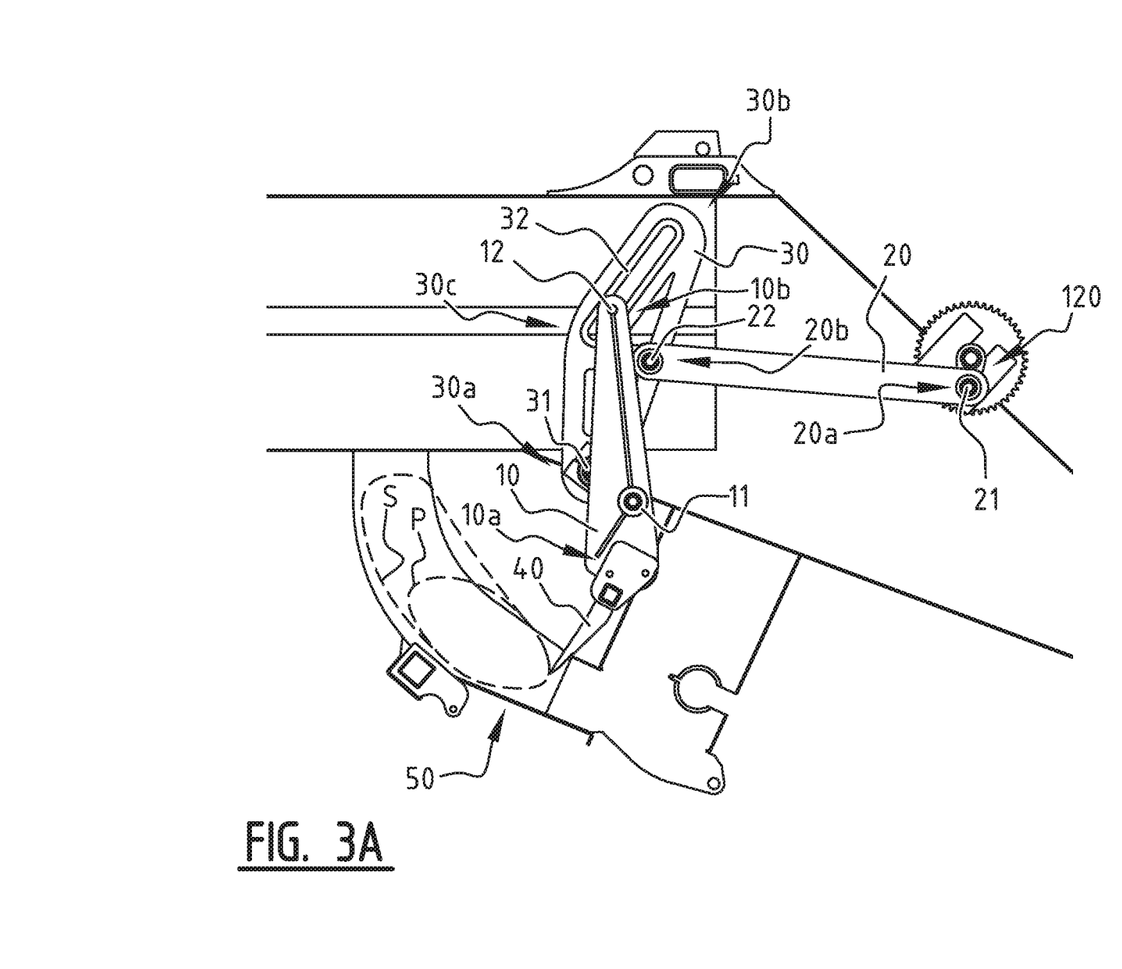
FIGS. 3A and 3B show a side view of the first exemplary embodiment of a stuffer mechanism at two different stages while performing a packer stroke.
Figure 3B:
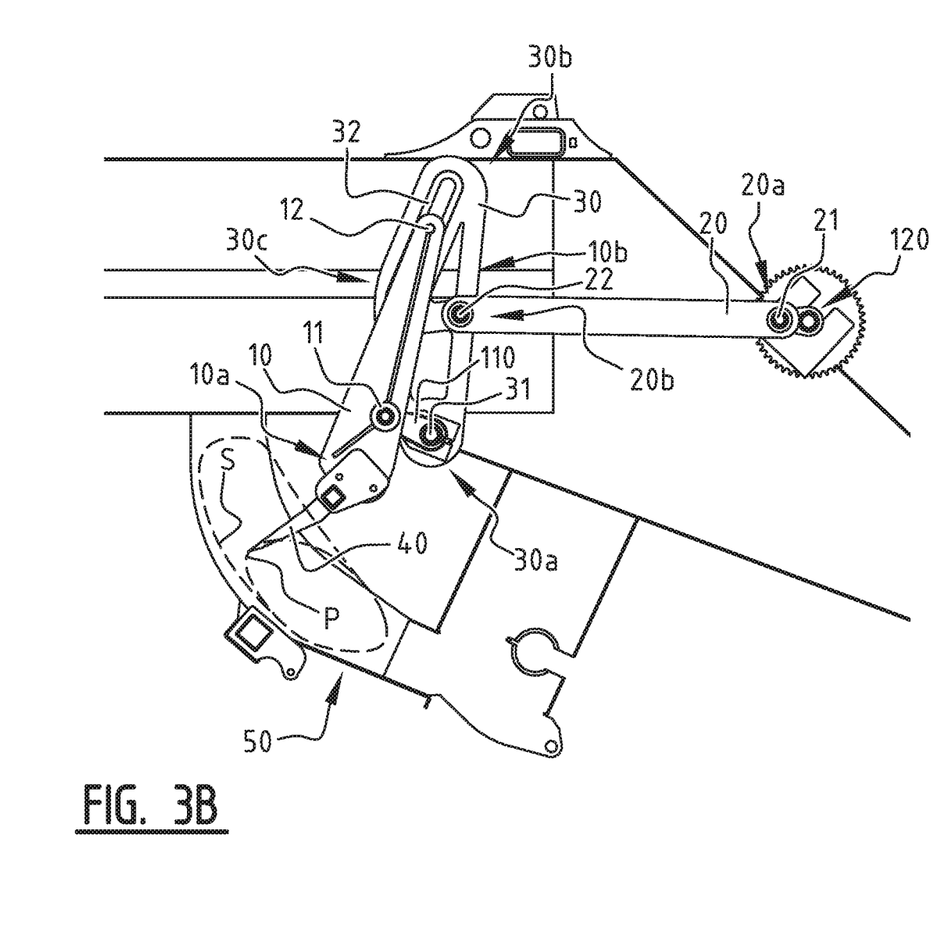

Preferably, slot 32 of the slot-pin connection 12, 32 is oriented at an angle α with respect to a vertical direction, said angle α being smaller than 30 degrees in the highest position of the coupling plate 30, see FIG. 3B.

FIGS. 2A-2D show various positions of the stuffer when performing a stuffer stroke S. FIGS. 3A and 3B show two positions during a packer stroke P. The path S, P followed by the tines 40 in a stuffer and packer stroke, respectively, is shown in dotted lines in FIG. 2A. In the packer mode, the depth of the path P is the same as that of the path S but the sweep along the intake duct 50 is much shorter terminating well before the tines 50 reach the end of the intake duct 50. In the packer mode of operation, the crop material in the intake duct 50 is merely redistributed within the intake duct 50 by moving it away from the packer mechanism and nearer to the upper end of the intake duct 50.

In both modes, movement of the first stuffer arm 10 is brought about by the displacement of the first and second pivot points 11 and 21 mounted on the first and second crank arms 110, 120 of two shafts coupled to the first and second drive mechanism. The first stuffer arm 10 is pivoted on the first pivot point 11, while the second pivot point 21, via second stuffer arm 20, coupling plate 30 and slot-pin connection 12, 32, serves as a follower of a cam track formed in coupling plate 30. The shafts on which the first and second crank arm 110, 120 are mounted, may be driven by the gearbox at twice the speed of the connecting rods 1240 driving the plunger 1800, optionally via a clutch that may be selectively disengaged.

Embodiments of the invention are based on the insight of the inventors that in certain prior art stuffer mechanisms, when loading the crops into the baling chamber, the forces are carried by two drive mechanisms, a first rotary drive mechanism directly coupled to the stuffer arm and a second drive mechanism connected to the fulcrum, i.e. the pin of a pin-slot connection between the stuffer arm and the second drive mechanism. In such embodiments, the fulcrum is located lower than the rotation axis of the first drive mechanism. Most of these forces are carried by the fulcrum. Because the fulcrum also needs to be displaced by the second drive mechanism, the second drive mechanism is exposed to high forces. In embodiments of the invention, to reduce this problem, the first drive mechanism (see first crank arm 110) and the fulcrum have switched places, wherein the first crank arm 110 is pivotally connected to the first stuffer arm in a position which is located closer to the intake duct 50 than the fulcrum, i.e. pin 12. This is further achieved by using a coupling plate 30 between the first stuffer arm 10 and a second stuffer arm 20 which is rotated by the second drive mechanism via crank arm 120. In that way, the forces exerted on the fulcrum, i.e. on pin 12 will be lower compared to prior art embodiments.

Also, in prior art embodiments, the fulcrum is displaced by the second drive mechanism, and the stuffer arm is moved in a linear motion relative to the fulcrum, through a slot. This linear motion in the slot is sensitive to dust, because the dust is crushed under the wheel. Also, a slot needs lubrication and dust may be stuck in the grease. In prior art embodiments, the slot is typically close to the intake duct, and hence very sensitive to dust. In embodiments of the invention, the slot may be located further away from the intake duct 50, and the first drive mechanism closer to the intake duct 50, hence reducing the influence of dust in the slot. The fulcrum, i.e. pin 12 is positioned further away from the intake duct 50, resulting in a lower torque arm and less dust. In other words, in embodiments of the invention, the forces on the fulcrum, on the sensitive slot and on the second drive mechanism may be lower, resulting in less wear of the sensitive parts. The forces on the first drive mechanism are higher, but this first drive mechanism may be robust and better resistant to dust, since good sealed bearings may be used and no linear moving parts are required.

The first drive mechanism which is connected via crank arm 110 to the first stuffer arm 10 is configured to at least move the tines 40 in and out of the intake duct 50. The fulcrum, i.e. pin 12 is displaced by moving the slot plate 30 by the second crank arm 120 associated with the second drive mechanism. The second drive mechanism may be mechanically dependent of the main driving mechanism as e.g. disclosed in European patent EP 2 713 704 in the name of the Applicant, which is included herein by reference. In an alternative embodiment, the second drive mechanism can be mechanically independent of the main driving mechanism.

Advantages of embodiments of the invention include obtaining a force shift from the sensitive fulcrum 12 to a fixed, solid, first drive mechanism. This implies less wear for the slot 32 and fulcrum 12. Typically, the first drive mechanism (first crank arm 110) may be rotating continuously, whilst the second drive mechanism (second crank arm 120) may be actuated as desired to do stuffer strokes S, transporting the crop material in the baling chamber 1500. Shifting force to the first drive mechanism is advantageous for the actuation and acceleration of the second drive mechanism. Because less force is exerted on the second drive mechanism it may be advantageous to add a clutch or another system to change the stuffer stroke, e.g. depending on a trip signal, with less risks of having a timing error. Another advantage is less dust impact on the slot 32. With slot 32 further away from the intake duct 50, a less curved shape of the slot is needed, and even a straight slot may be used. Such a slot results in a more stable, calm, quiet and reliable system.

Figure 4:
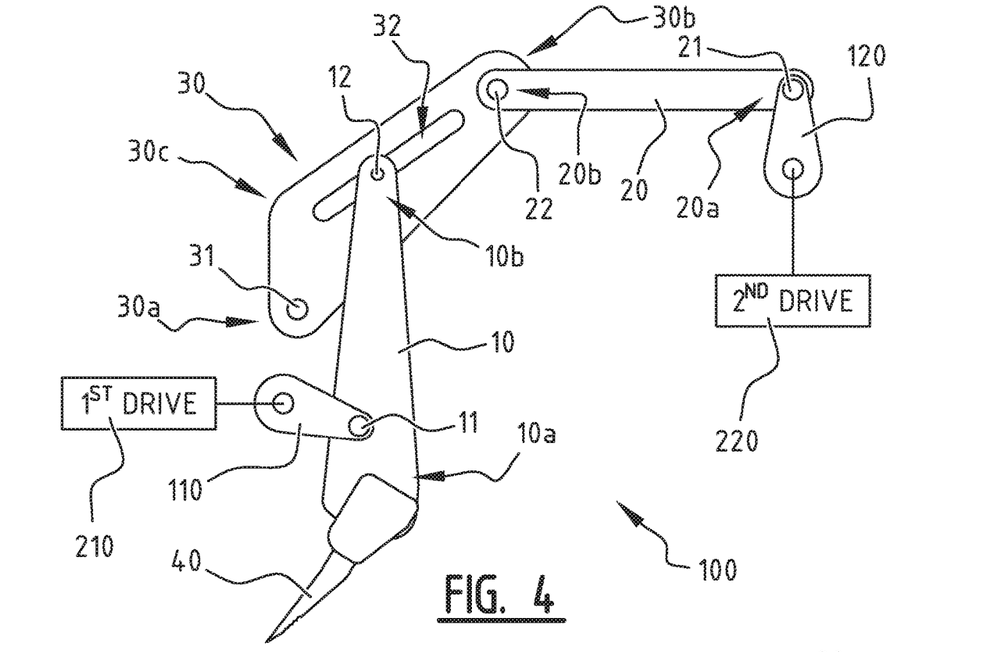
FIG. 4 is a schematic side view of a second exemplary embodiment of a stuffer mechanism.

FIG. 4 illustrates a second exemplary embodiment of a stuffer mechanism according to the invention. As in the first exemplary embodiment, the stuffer mechanism 100 is configured to selectively execute a packer stroke to advance crop material partially along an intake duct and a stuffer stroke to transfer the crop material accumulated in the intake duct into the baling chamber. The stuffer mechanism 100 comprises a tine bar extending between two first stuffer assemblies. Only one stuffer assembly is visible in the side view of FIG. 4. The other stuffer assembly can be the same or different. The first stuffer arm 10 is connected at a first pivot point 11 to a first crank arm 110 of a first drive mechanism 210. The stuffer mechanism 100 further comprises a second stuffer arm 20 connected at a second pivot point 21 to a second crank arm 120 of a second drive mechanism 220. The first stuffer arm 10 is connected to the second stuffer arm 20 via a pivotally mounted coupling plate 30. The coupling plate 30 is pivotally mounted around a stationary pivot point 31. The coupling plate 30 is coupled to the first stuffer arm 10 through a slot-pin connection 12, 32. The first pivot point 11 of the first stuffer arm 10 is nearer to the intake duct 50 than the second pivot point 21 of the second stuffer arm 20.

The coupling plate 30 has a substantially triangular shape with a bottom corner 30a, a top corner 30b, and an intermediate corner 30c. However, other shapes are possible. The coupling plate 30 is provided with a slot 32 as part of the slot-pin connection 12, 32. The first stuffer arm 10 is an elongate arm having a first end 10a connected to the tine bar, and a second end 10b which is provided with a pin 12 which is moveable in the slot 32. The first stuffer arm 10 is connected at the first pivot point 11 to the first crank arm 110, and the first pivot point 11 is located nearer to the first end 10a than to the second end 10b. The second stuffer arm 20 has a first end 20a connected to the second crank arm 120 and a second end 20b. The second end 20b is connected pivotally at a pivot point 22 with the coupling plate 30.

The stationary pivot point 31 has a pivot axis which is parallel with but does not correspond with a rotation axis of the first drive mechanism around which the first crank arm 110 rotates. The stationary pivot point 31 around which the coupling plate 30 is pivotally mounted is preferably in a lower half of the coupling plate 30, more preferably in a lower third of the coupling plate 30. Preferably, slot 32 is provided in an upper two thirds of the coupling plate. The coupling plate 30 is pivotally connected to the second stuffer arm 20 at a pivot point 22 which is located near the top corner 30b. Compared to the first exemplary embodiment, by locating the pivot point 22 near the top corner 30b, the forces on the second drive mechanism will be further reduced, but this design requires more displacement of the second stuffer arm 20.

Preferably, slot 32 of the slot-pin connection 12, 32 is substantially straight in order to limit the load on the slot plate, but it is also possible to have a curved slot 32. Preferably, slot 32 of the slot-pin connection 12, 32 is oriented at an angle α with respect to a vertical direction, said angle α being smaller than 30 degrees in the highest position of the coupling plate 30, as in the first exemplary embodiment.

Figure 5:
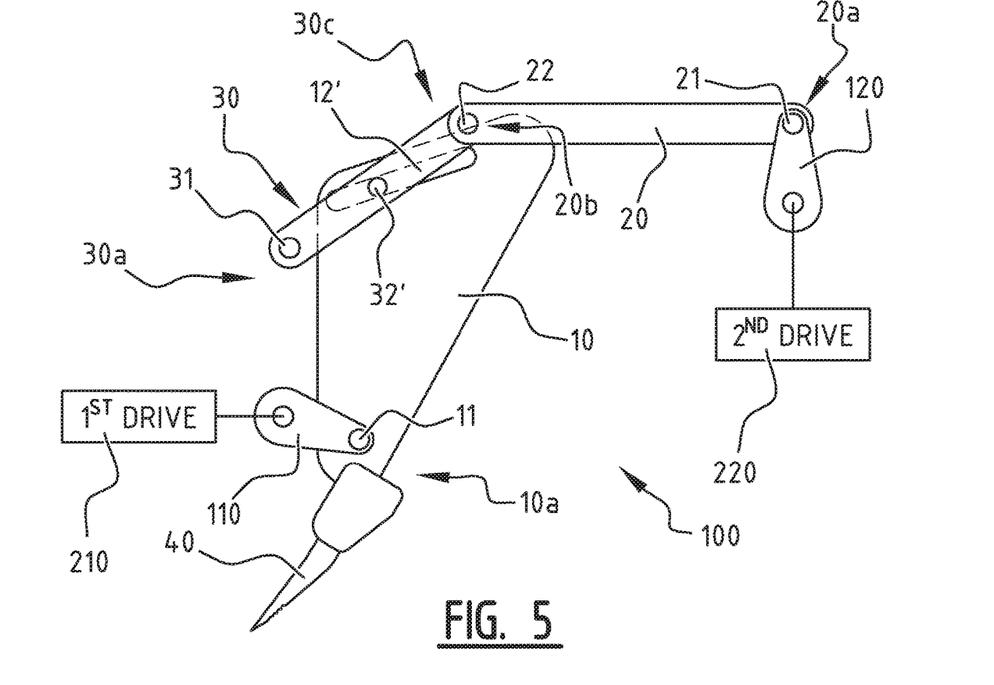
FIG. 5 is a schematic side view of a third exemplary embodiment of a stuffer mechanism.

FIG. 5 illustrates a third exemplary embodiment of a stuffer mechanism according to the invention. As in the first exemplary embodiment, the stuffer mechanism 100 is configured to selectively execute a packer stroke to advance crop material partially along an intake duct and a stuffer stroke to transfer the crop material accumulated in the intake duct into the baling chamber. The stuffer mechanism 100 comprises a tine bar extending between two first stuffer assemblies. Only one stuffer assembly is visible in the side view of FIG. 5. The other stuffer assembly can be the same or different. In other words, the stuffer mechanism 100 may be symmetrical with the same stuffer assemblies at a left and right side of the baler, and with driving mechanisms on both sides, or may be asymmetrical, e.g. with a driving mechanism at only one side.

The first stuffer arm 10 is connected at a first pivot point 11 to a first crank arm 110 of a first drive mechanism 210. The stuffer mechanism 100 further comprises a second stuffer arm 20 connected at a second pivot point 21 to a second crank arm 120 of a second drive mechanism 220. The first stuffer arm 10 is connected to the second stuffer arm 20 via a pivotally mounted coupling plate 30. The coupling plate 30 is pivotally mounted around a stationary pivot point 31. The coupling plate 30 is coupled to the first stuffer arm 10 through a slot-pin connection 12', 32'. The first pivot point 11 of the first stuffer arm 10 is nearer to the intake duct 50 than the second pivot point 21 of the second stuffer arm 20.

The coupling plate 30 has an elongated shape with a bottom end 30a and a top end 30c. The first stuffer arm 10 is provided with a slot 12' as part of the slot-pin connection 12', 32'. The first stuffer arm 10 is here substantially triangular having a bottom corner 10a connected to the tine bar, and an upper part which is provided with a slot 12' in which a pin 32' connected to the coupling plate 30 is moveable. The first stuffer arm 10 is connected at the first pivot point 11 to the first crank arm 110, and the first pivot point 11 is located nearer to the bottom corner 10a than to the upper part of the first stuffer arm 10. The second stuffer arm 20 has a first end 20a connected to the second crank arm 120 and a second end 20b. The second end 20b is connected pivotally at a pivot point 22 with the coupling plate 30.

The stationary pivot point 31 has a pivot axis which is parallel with but does not correspond with a rotation axis of the first drive mechanism around which the first crank arm 110 rotates. Alternatively, the pivot axis may correspond with the rotation axis as in the first exemplary embodiment. The stationary pivot point 31 around which the coupling plate 30 is pivotally mounted is preferably in a lower half of the coupling plate 30, more preferably in a lower third of the coupling plate 30. Preferably, pin 32' is provided in an upper two thirds of the coupling plate 30, wherein these parts, i.e. lower third part and upper two third parts, are defined as in the first exemplary embodiment. The coupling plate 30 is pivotally connected to the second stuffer arm 20 at a pivot point 22 which is located near the top end 30c.

Preferably, slot 12' of the slot-pin connection 12', 32' is substantially straight in order to limit the wear of the slot-pin connection 12', 32', but it is also possible to have a curved slot 12'. Although not illustrated, slot 12' of the slot-pin connection 12', 32' may be oriented at an angle α with respect to a vertical direction, said angle α being smaller than 30 degrees in the highest position of the coupling plate 30, as in the first exemplary embodiment.

Figure 6:
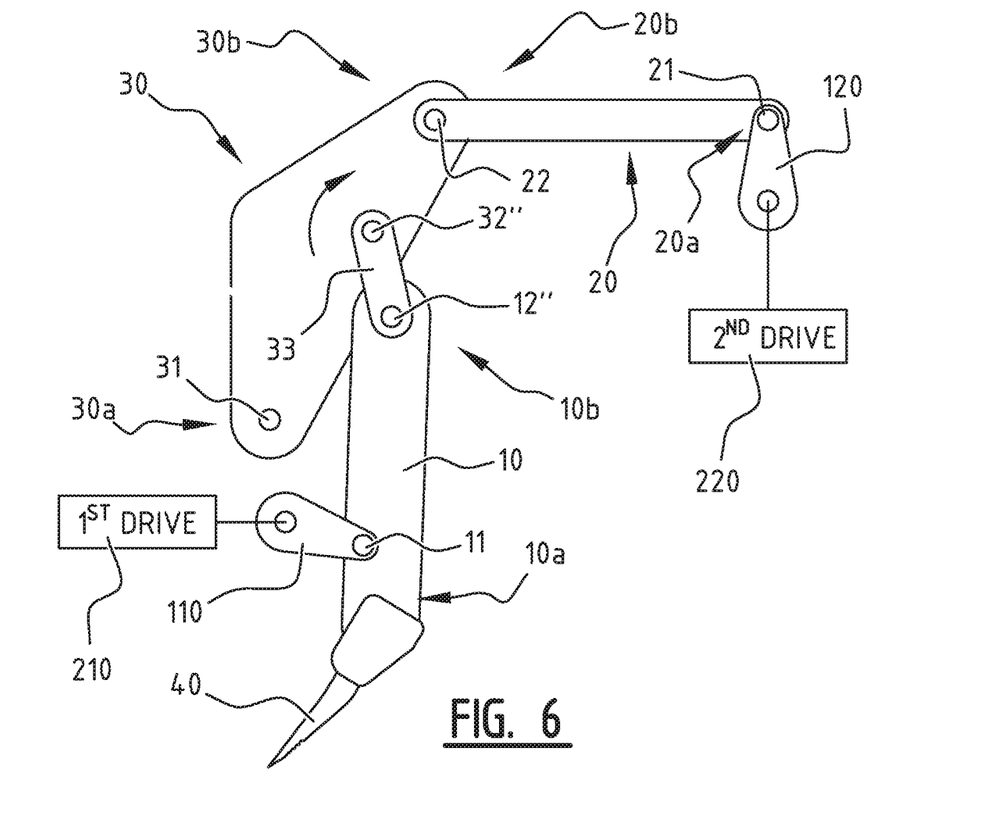
FIG. 6 is a schematic side view of a fourth exemplary embodiment of a stuffer mechanism.

FIG. 6 illustrates a fourth exemplary embodiment of a stuffer mechanism according to the invention. As in the first exemplary embodiment, the stuffer mechanism 100 is configured to selectively execute a packer stroke to advance crop material partially along an intake duct and a stuffer stroke to transfer the crop material accumulated in the intake duct into the baling chamber. A first stuffer arm 10 is connected at a first pivot point 11 to a first crank arm 110 of a first drive mechanism 210. The stuffer mechanism 100 further comprises a second stuffer arm 20 connected at a second pivot point 21 to a second crank arm 120 of a second drive mechanism 220. The first stuffer arm 10 is connected to the second stuffer arm 20 via a pivotally mounted coupling plate 30. The coupling plate 30 is pivotally mounted around a stationary pivot point 31. The coupling plate 30 is coupled to the first stuffer arm 10 through a connection 12", 32", 33. The first pivot point 11 of the first stuffer arm 10 is nearer to the intake duct 50 than the second pivot point 21 of the second stuffer arm 20.

The coupling plate 30 has a bottom end 30a and a top end 30b. The connection 12", 32", 33 comprises a crank arm 33. One end of crank arm 33 is connected pivotally to the first stuffer arm 10 at pivot point 12", and the other end of the crank arm 33 is connected pivotally to the coupling plate 30 in pivot point 32". The first stuffer arm 10 is an elongate arm having a first end 10a connected to the tine bar, and a second end 10b where pivot point 12" is located. This pivot point 12" is moveable with respect to the coupling plate 30 via the crank arm 33. The first stuffer arm 10 is connected at the first pivot point 11 to the first crank arm 110, and the first pivot point 11 is located nearer to the first end 10a than to the second end 10b. The second stuffer arm 20 has a first end 20a connected to the second crank arm 120 and a second end 20b. The second end 20b is connected pivotally at a pivot point 22 with the coupling plate 30 near the top end 30b. In the illustrated variant the stationary pivot point 31 has a pivot axis which is parallel with but does not correspond with a rotation axis of the first drive mechanism around which the first crank arm 110 rotates. However, it is also possible to arrange pivot point 31 on the axis of the first drive mechanism 210. The stationary pivot point 31 around which the coupling plate 30 is pivotally mounted is preferably in a lower half of the coupling plate 30, more preferably in a lower third of the coupling plate 30. Preferably, pivot point 32" is provided in an upper two thirds of the coupling plate. In such an embodiment the path followed by the pivot point 12" is typically less straight compared to the previous embodiments with a slot-pin connection, and typically more space will be required, but as the crank arm 33 performs a rotating movement it is less hindered by the presence of dust.

Whilst the principles of the invention have been set out above in connection with specific embodiments, it is to be understood that this description is merely made by way of example and not as a limitation of the scope of protection which is determined by the appended claims.

What is claimed is:

1. A rectangular baler comprising:
a baling chamber;
a plunger reciprocally mounted in the baling chamber for compressing crop material;
an intake duct for accumulating crop material before transfer into the baling chamber;
a pick-up mechanism for picking up crop material and introducing the crop material into the intake duct; and
a stuffer mechanism configured to selectively execute a packer stroke to advance crop material partially along the intake duct and a stuffer stroke to transfer the crop material accumulated in the intake duct into the baling chamber, the stuffer mechanism comprising two stuffer assemblies at each side of the baler and a tine bar extending between the two stuffer assemblies, and at least one of the two stuffer assemblies comprising:
a first stuffer arm connected at a first pivot point to a first crank arm of a first drive mechanism;
a second stuffer arm connected at a second pivot point to a second crank arm or disc of a second drive mechanism; and
a coupling plate pivotally mounted around a stationary pivot point, the coupling plate coupling the first stuffer arm with the second stuffer arm, wherein the coupling plate is coupled to the first stuffer arm through a connection configured to allow a predetermined limited movement of the first stuffer arm with respect to the coupling plate, and wherein the coupling plate comprises a top corner and a bottom corner,
wherein the second stuffer arm is pivotally connected to the coupling plate at a pivot point located between the top and bottom corners of the coupling plate, and
wherein the tine bar is connected to the first stuffer arm.

2. The rectangular baler of claim 1, wherein the connection is a slot-pin connection.

3. The rectangular baler of claim 2, wherein the coupling plate has a slot as part of the slot-pin connection, and wherein the first stuffer arm is provided with a pin which is moveable in the slot.

4. The rectangular baler of claim 3, wherein the first stuffer arm has a bottom end and a top end, wherein the first pivot point is located nearer to the bottom end than to the top end, and wherein the pin is located nearer to the top end than to the bottom end.

5. The rectangular baler of claim 1, wherein the first drive mechanism is configured to rotate at a first rotational speed which is a multiple of a second rotational speed of the second drive mechanism.

6. The rectangular baler of claim 1, wherein the stationary pivot point has a pivot axis which corresponds with a rotational axis of the first drive mechanism around which the first crank arm rotates.

7. The rectangular baler of claim 1, wherein the stationary pivot point around which the coupling plate is pivotally mounted is in a lower half of the coupling plate, and wherein the lower half of the coupling plate is the area of the coupling plate below half of a height of the coupling plate when the coupling plate is in a highest position.

8. The rectangular baler of claim 7,
wherein the coupling plate has a slot as part of the slot-pin connection,
wherein the first stuffer arm is provided with a pin which is moveable in the slot,
wherein the slot is provided in an upper two thirds of the coupling plate, and
wherein the upper two thirds of the coupling plate is an area of the coupling plate above one third of the height of the coupling plate when the coupling plate is in the highest position.

9. The rectangular baler of claim 7,
wherein the first stuffer arm has a bottom end and a top end, wherein the first pivot point is located nearer to the bottom end than to the top end,
wherein the pin is located nearer to the top end than to the bottom end, and
wherein the coupling plate is pivotally connected to the second stuffer arm at a pivot point which is located between the slot and the stationary pivot point.

10. The rectangular baler of claim 3, wherein the slot of the slot-pin connection is substantially straight.

11. The rectangular baler of claim 3, wherein the slot of the slot-pin connection is oriented at an angle with respect to a vertical direction, the angle being smaller than 30 degrees in a highest position of the coupling plate.

12. The rectangular baler of claim 1, wherein the first pivot point of the first stuffer arm is nearer to the intake duct than the second pivot point of the second stuffer arm.

13. The rectangular baler of claim 2, wherein the coupling plate is a polygon, having the bottom corner and the top corner, wherein the stationary pivot point is closer to the bottom corner than to the top corner, and wherein the slot-pin connection is closer to the top corner than to the bottom corner.

14. The rectangular baler of claim 1, wherein the connection comprises a crank arm or disc, and wherein a first point of the crank arm or disc is connected pivotally to the first or second stuffer arm and a second point of the crank arm or disc is connected pivotally to the coupling plate.

* * * * *